Nov. 16, 1971          T. W. GOOD ET AL          3,619,940
                    ARTICULATED TOY VEHICLE
Filed Nov. 25, 1969                         2 Sheets-Sheet 2
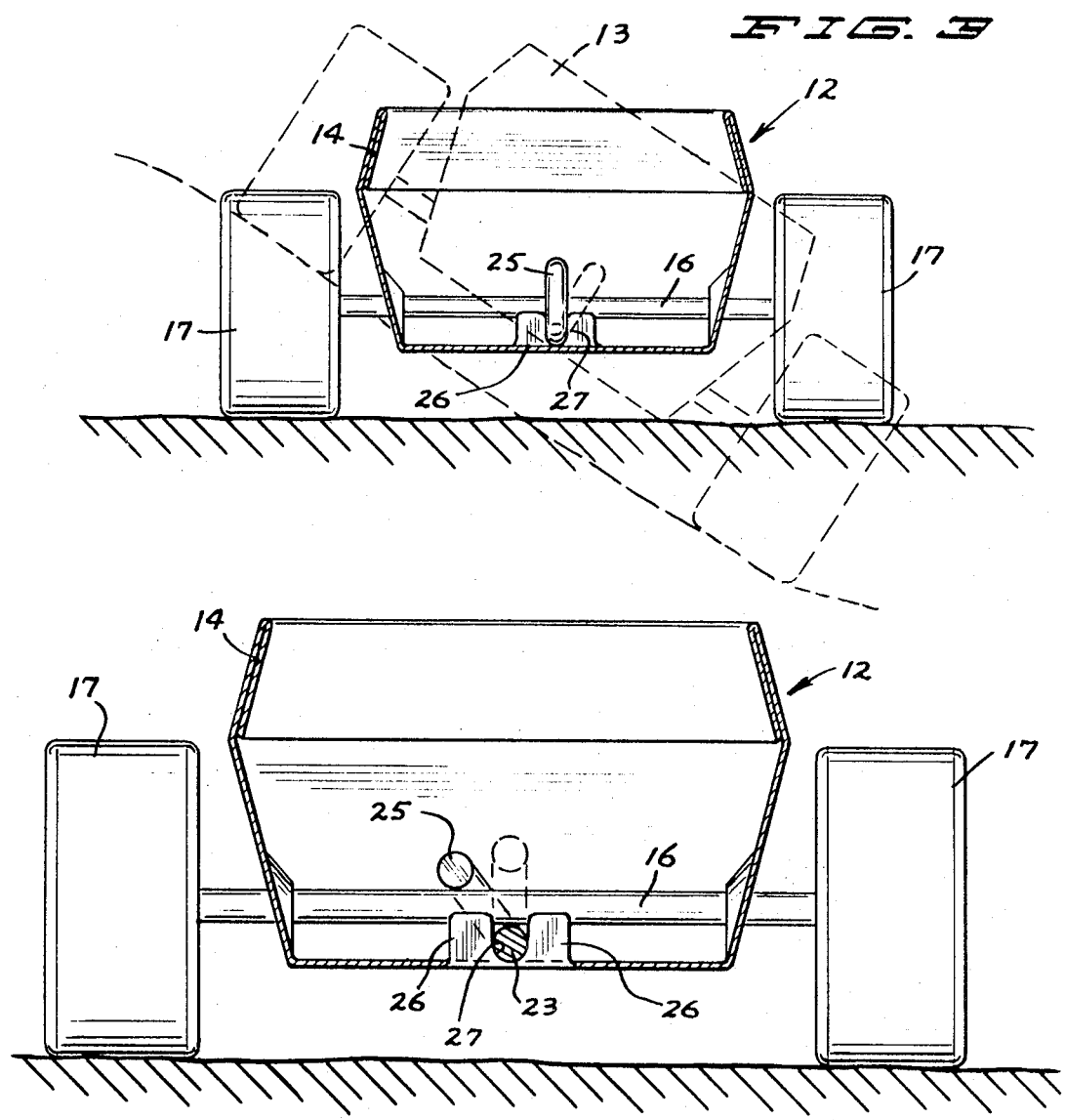
INVENTORS
THOMAS W. GOOD
THEODORE H. ZBIKOWSKI
BY
Carlsen, Carlsen & Sturm
ATTORNEYS United States Patent Office 3,619,940
Patented Nov. 16, 1971

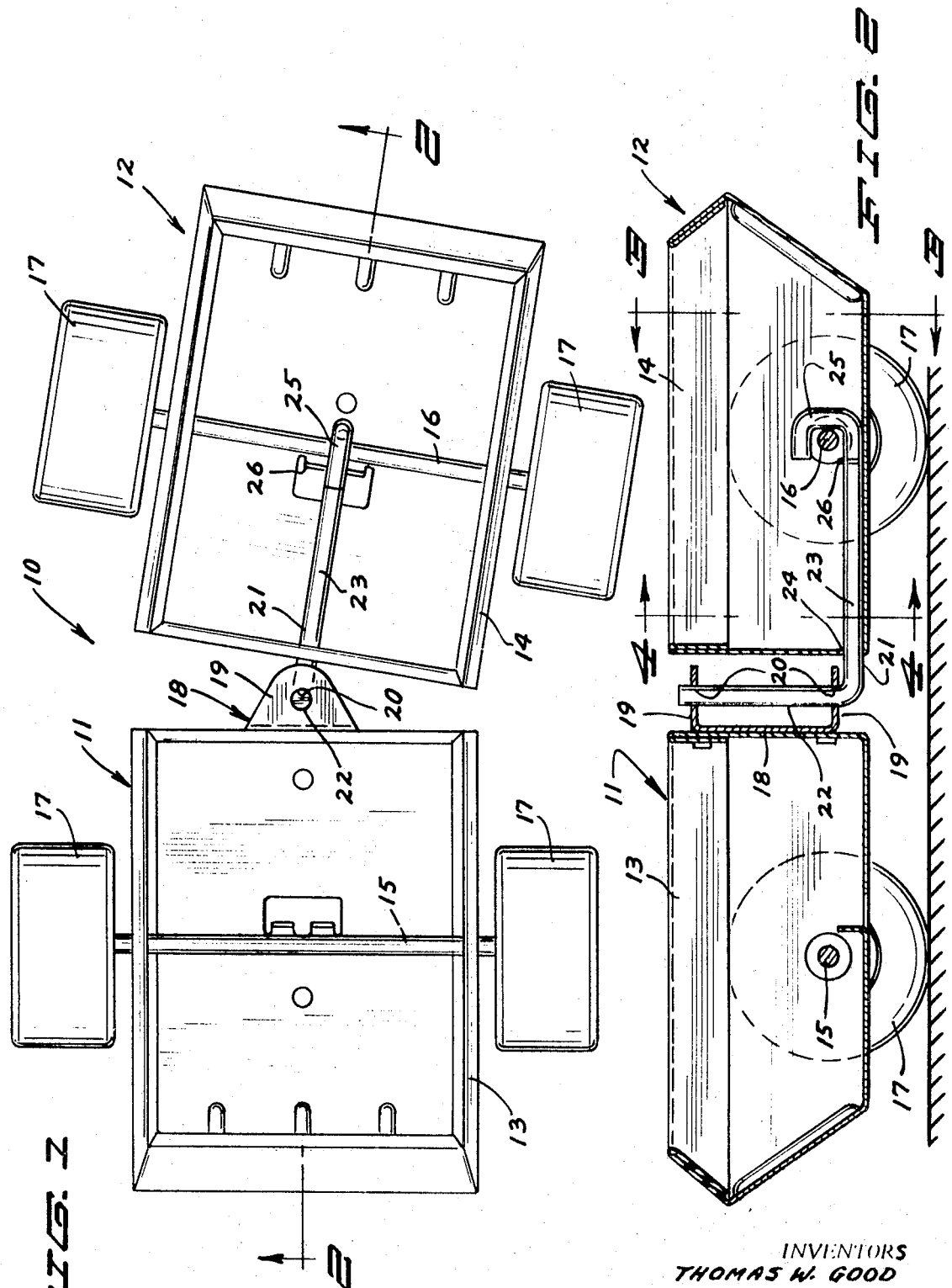

3,619,940
ARTICULATED TOY VEHICLE
Thomas W. Good, Golden Valley, and Theodore H. Zbikowski, Plymouth, Minn., assignors to Tonka Corporation, Mound, Minn.
Filed Nov. 25, 1969, Ser. No. 879,713
Int. Cl. A63h *11/10*
U.S. Cl. 46—201   3 Claims

ABSTRACT OF THE DISCLOSURE

An articulated toy vehicle comprising two wheeled vehicle units interconnected in tandem draft relation with the connection effected by a hitch link having one end pivoted on a vertical axis to a laterally central point on one vehicle and extending longitudinally of the body of the other vehicle and loosely around the wheel axle thereof to allow limited tilting of said axle and other vehicle about a longitudinal axis.

---

The primary object of the invention is to provide a toy vehicle comprising two wheeled vehicle units hitched together in tandem relation and wherein the hitch means permits relative movement of the units about both vertical and longitudinal axes so that both units will maintain wheel contact with a ground or floor surface when the vehicle is moved over the surface.

Another object of the invention is to provide an articulated toy vehicle having a hitch member permitting limited universal movement between two vehicle units and which member is inexpensive to manufacture, yet durable and simple to install.

With these objects in mind the invention broadly comprises a pair of wheeled toy vehicle units interconnected in tandem relation by a generally L-shaped wire hitch member having one leg journaled in a bracket on one unit for relative movement of the units about a vertical axis and the other leg extending longitudinally along the other unit with the end portion thereof curled loosely around the wheel axle of the other unit to allow relative movement of the units about a longitudinal axis.

The above mentioned and other objects of the invention will be brought to light during the course of the following specification, reference being made to the accompanying drawings, in which—

FIG. 1 is a plan view of the vehicle showing the vehicle units in a relatively turning relation about their interconnected vertical pivot axis.

FIG. 2 is a longitudinal vertical section through the vehicle taken on line 2—2 of FIG. 1 but showing the hitch member in elevation.

FIG. 3 is a transverse vertical section taken through one of the vehicle units on line 3—3 of FIG. 2 and showing the other vehicle unit in broken lines in relatively tilted position about the longitudinal axis of the hitch member.

FIG. 4 is a transverse vertical section taken through one of the vehicle units on line 4—4 of FIG. 2 and showing the hitch element in tilted or canted position when the other vehicle unit is tilted as in FIG. 3. The normal position of the hitch element is shown in broken lines.

Referring now more particularly to the drawings, reference numerals will be used to denote like parts or structural features in the different views. The vehicle denoted generally at 10 comprises vehicle units 11 and 12 which may be identical as shown. Units 11 and 12 are respectively provided with bodies 13 and 14 supported on axles 15 and 16 extending transversely therethrough and each carrying wheels 17 at its ends.

It will be obvious that the vehicle units 11 and 12 may take varying shapes and forms and that either may be designated and used as the draft or the trailing vehicle unit. For purposes of clarity here, however, the unit 11 will be referred to as the forward or draft unit and unit 12 as the rear or trailing unit.

The units are hitched in tandem relation so that as unit 11 is moved on its wheels over a floor or ground surface in a forward direction, the unit 12 will follow therebehind. The hitch includes a bracket 18 mounted centrally on the rear wall of the body 13 and having a pair of vertically spaced rearwardly projecting ears 19. The ears 19 are provided with vertically aligned apertures 20. A hitch member 21 is configured in a general L-shape of heavy rigid wire material which is round in cross section. The front leg 22 of member 21 is journaled in upright position in the apertures 20 of bracket 18 with the other leg 23 thereof extending horizontally rearward from beneath the bracket 18 through an opening 24 in the front wall of the body 14. The rear portion of leg 23 is curled upwardly and around the axle 16 as at 25. The bottom wall of body 14 has a pair of tabs 26 punched upwardly therefrom forming a notched saddle 27 therebetween for seating the leg 23 and securing it against lateral movement. During assembly the top of leg 22 is peened or burred to hold it in the bracket 18 against downward displacement.

It will be noted that when the components are in assembled condition the front wall of body 14 is very close to the ears 19, thus prohibiting relative forward movement of vehicle unit 12 to the point where axle 16 can become disengaged from the hook portion 25 of the hitch element. It will also be observed by reference to FIGS. 2 and 4 that the vertically spaced legs of hook portion 25 are spaced apart a distance 50 to 100 percent greater than the diameter of axle 16, thus permitting up to about thirty-five degrees (FIG. 3) of lateral tilting or canting of the hook portion relative to the axle before the hook portion binds against the upper and lower surfaces of the axle.

In use of the toy as it is moved over a supporting surface the units 11 and 12 are relatively swingable about a vertical axis formed by the leg 22 of the hitch member. Moreover, in the event that the lead vehicle unit 11 should engage a laterally irregular surface, it may freely tilt relative to unit 12, as shown in broken lines in FIG. 3, until the hook portion 25 clinches upon the axle 16 (FIG. 4). Accordingly, the units 11 and 12 are relatively movable within limits about both vertical and longitudinal axes.

Having now therefore fully illustrated and described our invention, what we claim to be new and desire to protect by United States Letters Patent is:

1. In a toy vehicle for movement over a supporting surface, first and second vehicle units each having a body supported on a pair of wheels, the wheels on the second unit mounted at the ends of an axle extending transversely through the body relative to the direction of movement, a hitch element extending longitudinally between and connecting the units in tandem relation, said element having two ends, one end portion pivotally connected to the first unit on a vertical axis then extending longitudinally through the body of the second unit and having its other end portion formed in a hook engaging vertically around said axle with vertically spaced legs thereof extending over and under the axle, said legs being spaced apart a distance substantially greater than the axle diameter to permit substantial relative lateral tilting of the axle within the hook before the hook legs bind against the upper and lower surfaces of the axle.

2. The subject matter of claim 1 wherein saddle means are provided on the body of the second unit for seating the hitch element to prohibit lateral sliding movement of the hook along the axle.

3. The subject matter of claim 1 wherein the hitch element has an upright leg at its forward end journaled in a bracket mounted on the first vehicle unit to form said pivotal connection.

References Cited

UNITED STATES PATENTS

| | | | |
|---|---|---|---|
| 1,864,781 | 6/1932 | Wells | 280—408 |
| 2,545,155 | 3/1951 | Logan | 46—201 |
| 2,884,083 | 4/1959 | McColl | 280—492 |
| 3,179,440 | 4/1965 | Bumby | 280—492 |

ROBERT PESHOCK, Primary Examiner

A. HEINZ, Assistant Examiner

U.S. Cl. X.R.

46—216, 221